Oct. 13, 1942.   H. C. GERRISH ET AL   2,298,288
MIXTURE RATIO INDICATOR
Filed April 10, 1939   2 Sheets-Sheet 2
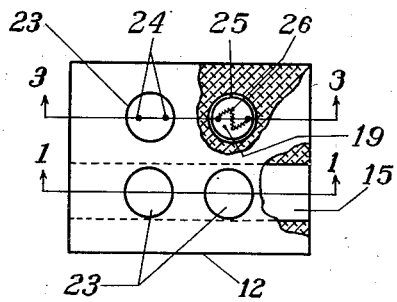
Fig. 2
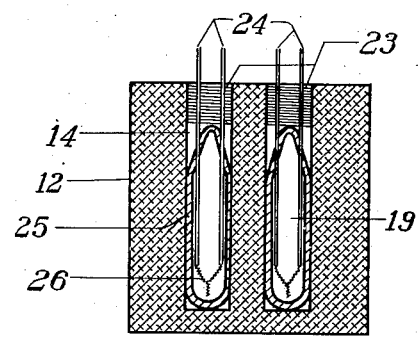
Fig. 3
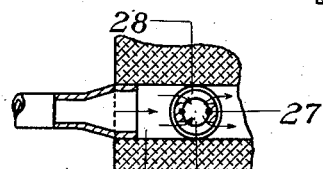
Fig. 4
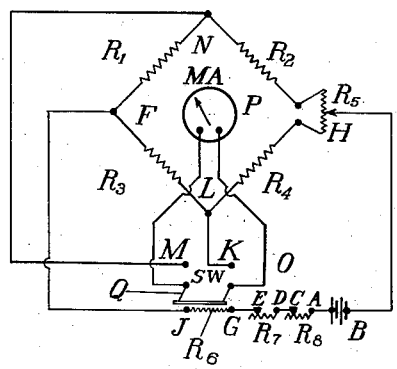
Fig. 6
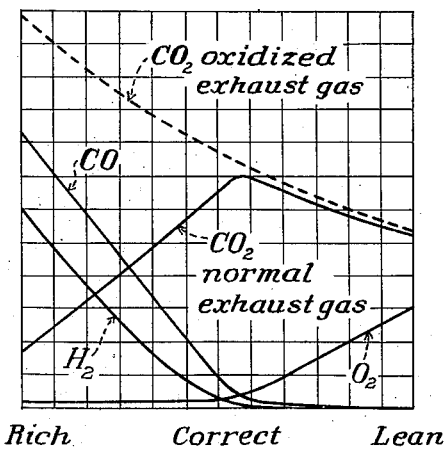
Fig. 8
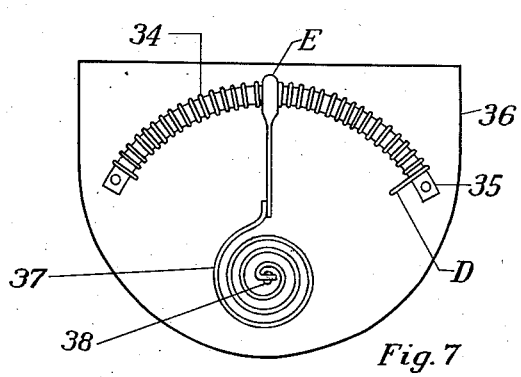
Fig. 5
Fig. 7
Inventor
Harold C. Gerrish
and
John G. Reuter
By Ransom K. Davis
Attorney Patented Oct. 13, 1942

2,298,288

UNITED STATES PATENT OFFICE 2,298,288

MIXTURE RATIO INDICATOR

Harold C. Gerrish and John G. Reuter, Hampton, Va.

Application April 10, 1939, Serial No. 267,178

3 Claims. (Cl. 23—255)

(Granted under the act of March 3, 1883, as amended April 30, 1928; 370 O. G. 757)

This invention relates to mixture ratio indicators and it has for its principal object to provide an instrument of the thermal conductivity type for indicating the ratio of air to fuel in a mixture of combustion gases for the entire mixture range including both rich and lean mixtures.

The most successful instruments to date for indicating the mixture strength of combustible mixtures are the hot wire instruments whose operation depends upon the variation of the thermal conductivity of the gases of combustion with mixture strength. An instrument of this type is essentially a Wheatstone bridge whose resistance elements consist partially or totally of filaments whose temperatures and therefore electrical resistances are influenced by the thermal conductivity of the gases surrounding them.

Referring to the combustion of hydrocarbons the thermal conductivity of the gases of combustion in the rich range depends mainly on the quantity of hydrogen present, as that constituent has a much greater thermal conductivity than the other constituents. However, the quantity of hydrogen decreases to zero as the air-fuel ratio increases to approximately the theoretically correct mixture ratio and remains at zero for leaner mixtures. Thus an instrument depending on the thermal conductivity of the gases of combustion as they issue from the exhaust port will be satisfactory in the rich region but will show only slight changes and in the opposite direction as the air-fuel ratio is increased into the lean range. Therefore such instruments are of no value for lean mixtures.

In our invention this defect is overcome by providing a means for oxidizing the combustible constituents of the products of combustion before conducting them to the analysis cells of the Wheatstone bridge. In this manner the hydrogen is completely eliminated from the products of combustion and the variation of the thermal conductivity of the resulting mixture of gases now depends mainly on the variation in the thermal conductivity of the carbon dioxide present. The percentage of carbon dioxide in the oxidized gases of combustion decreases continuously as the air-fuel ratio increases over the entire range of mixture strengths including rich and lean mixtures. It is evident that our invention will indicate without reversal throughout the entire range of mixture strengths.

Another purpose of our invention is to provide a light-weight, portable instrument of rugged construction, the readings of which are unaffected by vibration, the attitude of the instrument, surrounding temperature and pressure and thus adaptable for use under severe conditions such as encountered in aircraft operation.

A further object of this invention is to provide, in the cell block, analysis and comparison cells of standard manufacture so as to facilitate construction and produce a cell structure of relatively low cost. The preferred type of cells is of commercial manufacture altered to form suitable resistance elements as will be more fully disclosed in the specifications.

The invention is further characterized by the short time lag between change in mixture strength and meter indication. Various other advantageous features as well as these appear in the illustrations and description and are particularly pointed out in the claims which form a part of this specification.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 2 is a plan view, partly in section, of the cell block embodied in this invention containing analysis and comparison cells.

Fig. 3 is a sectional view of the cell block taken on line 3—3 of Fig. 2, showing the arrangement of the comparison cells.

Fig. 4 is a sectional view taken on line 4—4 of Fig. 1, showing the gas passages in the analysis cells.

Fig. 5 is a sectional view taken on line 5—5 of Fig. 1, showing gas passages in one of the analysis cells.

Fig. 6 is a diagram of the electrical circuit utilized in our invention.

Fig. 7 is a plan view of thermally controlled rheostat.

Fig. 8 is a graph showing the interrelation of products of combustion from a mixture of a hydrocarbon and air.

Figure 1:
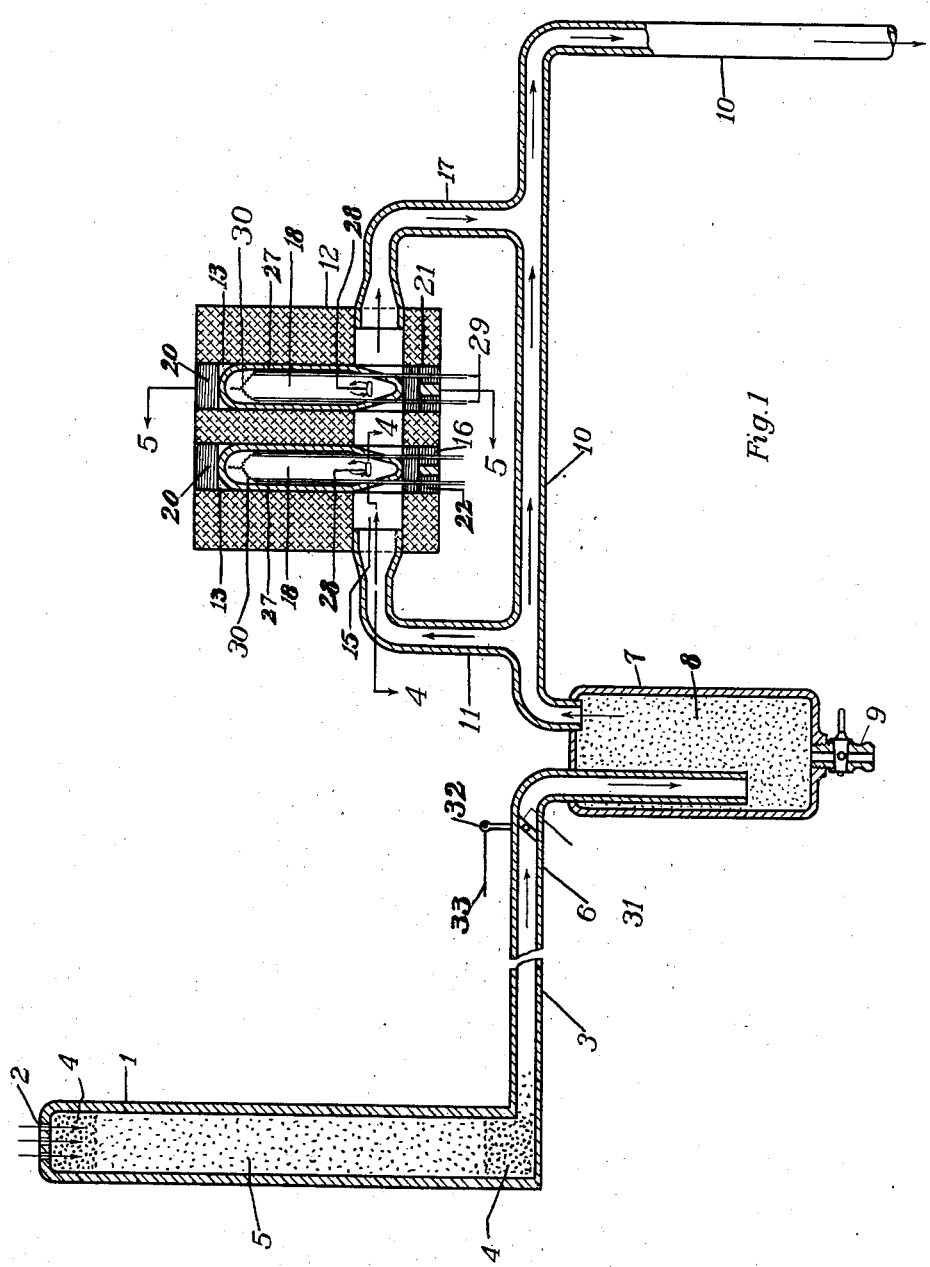
Fig. 1 is a sectional view of the invention taken on line 1—1 of Fig. 2.

The invention consists essentially of a means for oxidizing the products of combustion and a means sensitive to the thermal conductivity of the oxidized products of combustion for determining the air-fuel ratio and percentage composition of the products of combustion. Various devices such as filters, temperature compensating devices, etc., are added to improve the operation of the invention.

Referring to Fig. 1, the oxidizing device comprises a container 1, preferably made of high-temperature, corrosion-resisting material, which has at one end small openings 2 and at the other end an outlet passage 3 made of similar material. Inside the container 1 at both ends is porous material 4 between which is retained the oxidizing agent 5, such as copper oxide, hopcalite, or the like. When using certain oxidizing agents it may be necessary to expose the oxidizing agent to high temperature, for example, in the exhaust manifold of an internal-combustion engine. The outlet passage 3 is connected to the inlet passage 6 of the filter device.

The filter device comprises a casing 7 containing a filter 8, a drain 9, entrance passage 6, and exit passage 10. The component parts of the filter device are constructed of light-weight, corrosion-resisting materials.

The main gas passage or tube 10 has by-pass-gas passages 11 and 17.

Referring to Figs. 1, 2, and 3, the cell block 12 made preferably of light-weight material, highly resistant to corrosion and having high thermal conductivity, is provided with cell chambers 13 and 14 and a passage 15 communicating with cell chambers 13. Holes 16 in the cell block 12 are for passage of electrical conductors to cell chambers 13. Passage 15 communicates at one end with passage 11 and at the other end with passage 17. The analysis cells 18 are located in cell chambers 13 and are held in place by plugs 20, 21, and 22. The comparison cells 19 are inserted in chambers 14 and held in place by plugs 23. The plugs 20, 21, 22, and 23 are constructed of insulating material and provide a gas-tight seal at the ends of the chambers 13 and 14.

Each comparison cell 19 comprises a sealed, air-containing corrosion-resisting casing 25, electrical leads 24 extending through the casing 25, and filaments 26 fastened to the electrical leads 24 within casing 25. The electrical leads 24 pass through plugs 23. Each analysis cell 18 comprises a corrosion-resisting casing 27 provided at its lower end with passages 28, electrical leads 29 extending through the casing 27 and filaments 30 fastened to the electrical leads 29 and located near the upper end of casing 27. The distance between the passages 28 and the filaments 30 is made as large as is practical to avoid the effect of gas velocity on the cooling of the filaments. The cells 18 are located in the cell chambers 13 with the passages 28 perpendicular to the direction of flow of the oxidized products of combustion in passage 15 so that there is no direct passage of the oxidized products of combustion through the cells 18, but rather a diffusion of the gas into the cell. This is done to minimize the effect of gas velocity on the cooling of the filaments 30. The electrical leads 29 pass through the plugs 21 and 22. The cells 18 are characterized by their small volume, which reduces the time required to change the mixture in the cells and causes the instrument to respond rapidly to changes in mixture.

The valve 31 and means 32 and 33 for operation of same are shown in the main-gas passage 6 (Fig. 1) but could be located at other positions in the main-gas passage.

Fig. 6 is a wiring diagram of the electrical circuit, which may be employed in this invention. The various resistances $R_1$, $R_2$, $R_3$, and $R_4$ are the heating resistors used in the cell block 12. $R_1$ and $R_4$ may be the filaments 30 in the analysis cells 18 and $R_2$ and $R_3$ the filaments 26 in the comparison cells 19.

The resistor $R_5$ is connected between resistors $R_2$ and $R_4$ and is provided with a sliding contact H for adjusting the initial balance of the bridge. B represents a source of electrical potential and has one side connected to sliding contact H and the other side to point A on resistor $R_8$. Resistor $R_8$ is provided with a sliding contact C which may be manually adjusted. Contact C is connected to point D on resistor $R_7$. Resistor $R_7$ is provided with a slidable contact E. Referring in addition to Fig. 7, resistor $R_7$ indicated by 34 is fastened to insulating strip 35. Insulating strip 35 is fastened to panel 36. Bimetal strip 37 is fastened at one end to post 38 mounted on panel 36 and at its other end to sliding contact E. Thus the resistance of $R_7$ is controlled by the temperature of the bimetal strip 37. The bimetal strip 37 is mounted close to the cell block 12. The bimetal strip is arranged to reduce the resistance $R_7$ as the temperature increases to compensate for the increase in the remaining resistances with increase in ambient temperature thus insuring a constant current supply from the source B independent of the ambient temperature. The thermally controlled resistor $R_7$ is not vital to the invention when the ambient temperature does not vary appreciably.

Contact E is connected to switch point G through bimetal strip 37 and post 38. Switch point J is connected to the junction F of resistors $R_1$ and $R_3$. Switch point K is connected to the junction L of resistors $R_3$ and $R_4$. Switch point M is connected to the junction N of resistors $R_1$ and $R_2$. Switch arm O is connected to one terminal of the milliammeter P and the other terminal of the milliammeter is connected to switch arm Q. The switch arms O and Q may be adapted to move together. In one position switch arm O contacts switch point G and switch arm Q contacts switch point J while in the other position switch arm O contacts switch point K and switch arm Q contacts switch point M. Resistor $R_6$ is connected at one end to switch point G and at the other end to switch point J.

The circuit is adjusted by moving switch arms O and Q to contact switch points G and J, respectively. The sliding contact C is manually adjusted to give the desired reading on milliammeter P. The switch arms O and Q are then moved to contact switch points K and M, respectively, and with the same kind of gas in the analysis cells 18 as in the comparison cells 19 the sliding contact H is adjusted until the milliammeter P reads a predetermined value. The instrument is now considered adjusted and is ready for the passage of the test gas to be analyzed.

Referring to Fig. 1, the oxidizing device container 1 is located in a duct through which flow the products of combustion to be analyzed, for example, in the exhaust stack of an internal-combustion engine. The oxidizing device is mounted with the holes 2 facing upstream. The products of combustion pass through the porous material 4 into the oxidizing agent 5 where the unburned constituents are completely oxidized. The porous material is not vital to the invention but has been included to prevent loss of oxidizing agent at excessive gas velocities. The oxidized products of combustion then pass through the porous material 4 and through passages 3 and 6 into the filter device container 7. The oxidized products of combustion pass through the filter material 8 where water is removed and leaves filter device through passage 10. A portion of the gas flows through passage 11 into passage 15 of the cell block 12. Part of the test gas passing through passage 15 diffuses into cells 18 through passages 28 and surrounds the filaments 30 with the oxidized products of combustion. The thermal conductivity of the oxidized products of combustion will, in general, be different from that of the standard gas in the comparison cells. As a result the temperature and therefore the resistances of the filaments 30 and 26 will be different.

Referring to Fig. 6, changing the resistance of the resistors $R_1$ and $R_4$ which corresponds to filaments 30, changes the balance of the bridge and causes a displacement of the arm of the milliammeter P from its original adjusted position. The milliammeter P may be calibrated to read directly air-fuel ratio, fuel-air ratio, or the percentage composition of the products of combustion for any desired combustible.

The oxidized products of combustion leave the cell block through passage 17 and are conducted back to passage 10. The valve 31 located in passage 6 may be used for stopping the flow when no reading of the instrument is desired in order to conserve the oxidizing agent 5. The filter device 7 is not vital to the invention as moisture may be condensed in and drained through the passage 10 by providing the passage with a slope downward towards its exit. The volume of the cells 18 may be made small to insure a quick change of oxidized products of combustion and so provide an instrument with only a small time lag.

Fig. 8 further illustrates the operation of our invention when applied to a mixture of a hydrocarbon and air. The full lines represent the constituents in the products of combustion. The broken line represents the $CO_2$ present after the products of combustion have been oxidized. After oxidation the percentage of CO and $H_2$ becomes zero. It is seen that as the thermal conductivity of $H_2$ is very large compared to that of the other gases present, a device that is designed to operate on the unoxidized products of combustion will function between rich and theoretically correct mixtures but will show small changes in indication with increase in air-fuel ratio of the mixture into the lean range. In addition, a reversal of the direction of the indication will occur near the theoretically correct mixture, which will tend to add confusion to reading the instrument near the theoretical mixture. However, when the products of combustion are oxidized as specified in our invention the $H_2$ and CO disappear leaving $CO_2$ as the gas controlling the thermal conductivity of the resulting gas. The percentage of $CO_2$ as shown by the broken line in Fig. 8 decreases continuously over the range of air-fuel ratio including both rich and lean mixtures and a continuous indication may be obtained over that range. It is also seen from Fig. 8 that, for a mixture of air and any given hydrocarbon our instrument may be calibrated to read air-fuel ratio, fuel-air ratio, or the percentage of any of the constituents in the products of combustion, or all of these quantities. It is to be remembered that the above explanation is given only as an illustration of the operation of our invention and that our invention may be applied equally as well to other combustible mixture.

It will be understood that the above description and accompanying drawings comprehend only the general and preferred embodiment of the invention, and that various other changes in the construction, proportion and arrangement of the parts may be made by those skilled in the art without departing from the nature and scope of the invention as defined in the appended claims.

The invention described herein may be manufactured and/or used by or for the Government of the United States of America for governmental purposes without the payment of any royalties thereon or therefor.

What we claim is:

1. Apparatus for continuously indicating the fuel-air ratio of the exhaust gas from aircraft internal-combustion engines comprising a conduit communicating with a source of combustion gas; means in said conduit for oxidizing the products of combustion in said gas and for drying the oxidized gas; a Wheatstone bridge; a pair of comparison cells, each containing a resistor and a hermetically sealed standard gas, each of said resistors being connected in a separate leg of said bridge; a pair of analysis cells each containing a resistor and communicating with said conduit to admit by diffusion about the resistor therein a static quantity of the oxidized and dried gas, each of the resistors of said analysis cells being connected in a separate leg of said bridge; manually operable means for balancing the bridge circuit, and thermostatically controlled means connected in said bridge circuit for maintaining a constant current therein in accordance with the ambient temperature.

2. Apparatus for continuously indicating the fuel-air ratio of the exhaust gas from aircraft internal-combustion engines comprising a conduit communicating with a source of combustion gas; means in said conduit for oxidizing the products of combustion in said gas and for drying the oxidized gas; a Wheatstone bridge; a pair of comparison cells, each containing a resistor and a hermetically sealed standard gas, each of said resistors being connected in a separate leg of said bridge; a pair of analysis cells, each containing a resistor and communicating at one end only with said conduit to admit by diffusion about the resistor therein a static quantity of the oxidized and dried gas, each of the resistors of said analysis cells being connected in a separate leg of said bridge; manually operable means for balancing the bridge circuit, and thermostatically controlled means connected in said bridge circuit for maintaining a constant current therein in accordance with the ambient temperature.

3. Apparatus for continuously indicating the fuel-air ratio of the exhaust gas from aircraft internal-combustion engines comprising a conduit communicating with a source of combustion gas; means in said conduit for oxidizing the products of combustion in said gas and for drying the oxidized gas; a Wheatstone bridge; a pair of comparison cells, each containing a resistor and a hermetically sealed standard gas, each of said resistors being connected in a separate leg of said bridge; a pair of analysis cells, each containing a resistor and communicating at one end only with said conduit to admit by diffusion about the resistor therein a static quantity of the oxidized and dried gas, each of the resistors of said analysis cells being connected in a separate leg of said bridge; manually operable resistor for balancing the bridge circuit, and a thermostatically controlled bimetallic element connected in said bridge circuit for maintaining a constant current therein in accordance with the ambient temperature.

HAROLD C. GERRISH.
JOHN G. REUTER.